United States Patent
Ainslie et al.

(10) Patent No.: US 9,335,905 B1
(45) Date of Patent: May 10, 2016

(54) CONTENT SELECTION FEEDBACK

(71) Applicant: Google Inc., Mountain View, CA (US)

(72) Inventors: Alex Neely Ainslie, San Francisco, CA (US); Sebastien Vincent Gabriel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 213 days.

(21) Appl. No.: 14/101,276

(22) Filed: Dec. 9, 2013

(51) Int. Cl.
*G06F 3/048* (2013.01)
*G06F 3/0484* (2013.01)
*G06F 3/0482* (2013.01)
*G06F 17/30* (2006.01)

(52) U.S. Cl.
CPC ............ *G06F 3/0484* (2013.01); *G06F 3/0482* (2013.01); *G06F 17/30017* (2013.01)

(58) Field of Classification Search
CPC .................................................. G06F 17/30017
USPC .......................................................... 715/772
See application file for complete search history.

(56) References Cited

U.S. PATENT DOCUMENTS

| | | | | |
|---|---|---|---|---|
| 7,631,270 | B2 * | 12/2009 | Cunningham | G06F 3/04817 715/771 |
| 2009/0327448 | A1 * | 12/2009 | Williams | H04L 51/04 709/217 |
| 2010/0223556 | A1 * | 9/2010 | Wakabayashi | G01N 30/88 715/736 |
| 2012/0154408 | A1 | 6/2012 | Yukawa et al. | |
| 2013/0235044 | A1 * | 9/2013 | Kaleta | G06F 3/0484 345/473 |
| 2013/0239039 | A1 * | 9/2013 | Kaleta | G06F 3/0484 715/772 |
| 2014/0032717 | A1 * | 1/2014 | Sharp | H04L 67/06 709/219 |

FOREIGN PATENT DOCUMENTS

| | | |
|---|---|---|
| GB | 2490479 A | 11/2012 |
| JP | 2007064782 A | 3/2007 |
| KR | 2011029834 A | 3/2011 |

\* cited by examiner

*Primary Examiner* — William Titcomb
(74) *Attorney, Agent, or Firm* — McDermott Will & Emery LLP

(57) ABSTRACT

A system and machine-implemented method for visually providing feedback regarding a user selection are provided. The method includes receiving an indication of a user input with respect to a content item, wherein the input corresponds to a request to trigger one or more related actions for the content item, providing a visual indication in response to the request for display to the user, wherein the visual indication is provided in a first state showing that the request has been received, determining a status of the request, determining if the request is completed based on the status, updating the visual indication to a second state indicating the progress of the request based on the status if the request is not completed and providing the updated visual indication for display to the user.

21 Claims, 5 Drawing Sheets

CONTENT SELECTION FEEDBACK

BACKGROUND

Electronic devices equipped with touchscreens have become increasingly popular. These devices typically provide mechanisms for performing various actions with respect to content being displayed at the device using various gestures. However, usually a user is not able to confirm whether a selection has actually been correctly received at the device, and/or when the task is completed.

SUMMARY

The disclosed subject matter relates to a machine-implemented method for visually providing feedback regarding a user selection, the method comprising receiving an indication of a user input with respect to a content item, wherein the input corresponds to a request to trigger one or more related actions for the content item. The method may further comprise providing a visual indication in response to the request for display to the user, wherein the visual indication is provided in a first state showing that the request has been received. The method may further comprise determining a status of the request. The method may further comprise determining if the request is completed based on the status. The method may further comprise updating the visual indication to a second state indicating the progress of the request based on the status if the request is not completed. The method may further comprise providing the updated visual indication for display to the user.

The disclosed subject matter also relates to a system for visually providing feedback regarding a user selection, the system comprising one or more processors and a machine-readable medium comprising instructions stored therein, which when executed by the processors, cause the processors to perform operations comprising receiving an indication of a user input with respect to content, wherein the input corresponds to a request to trigger one or more related actions for the content. The operations may further comprise providing a visual indication in response to the request for display to the user in a first state showing that the request has been received. The operations may further comprise determining a status of the request. The operations may further comprise determining if the request is completed based on the status. The operations may further comprise updating the visual indication to a second state indicating the progress of the request based on the status if the request is not completed. The operations may further comprise updating the visual indication to a third state indicating that the request is completed when the request is completed. The operations may further comprise providing the updated visual indication for display to the user.

The disclosed subject matter also relates to a machine-readable medium comprising instructions stored therein, which when executed by a machine, cause the machine to perform operations comprising receiving an indication of a user input with respect to a content item, wherein the input corresponds to a request to trigger one or more related actions for the content item. The operations may further comprise providing a visual indication provided in a first state showing that the request has been received for display to the user in response to the request. The operations may further comprise determining a status of the request. The operations may further comprise determining a scope of the request. The operations may further comprise determining if the request is completed based on the status. The operations may further comprise updating the visual indication to a second state indicating the progress of the request based on the status if the request is not completed. The operations may further comprise updating the visual indication to a third state indicating that the request is completed when the request is completed, wherein the updated visual indication in the third state provides an indication of the scope of the request. The operations may further comprise providing the updated visual indication for display to the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
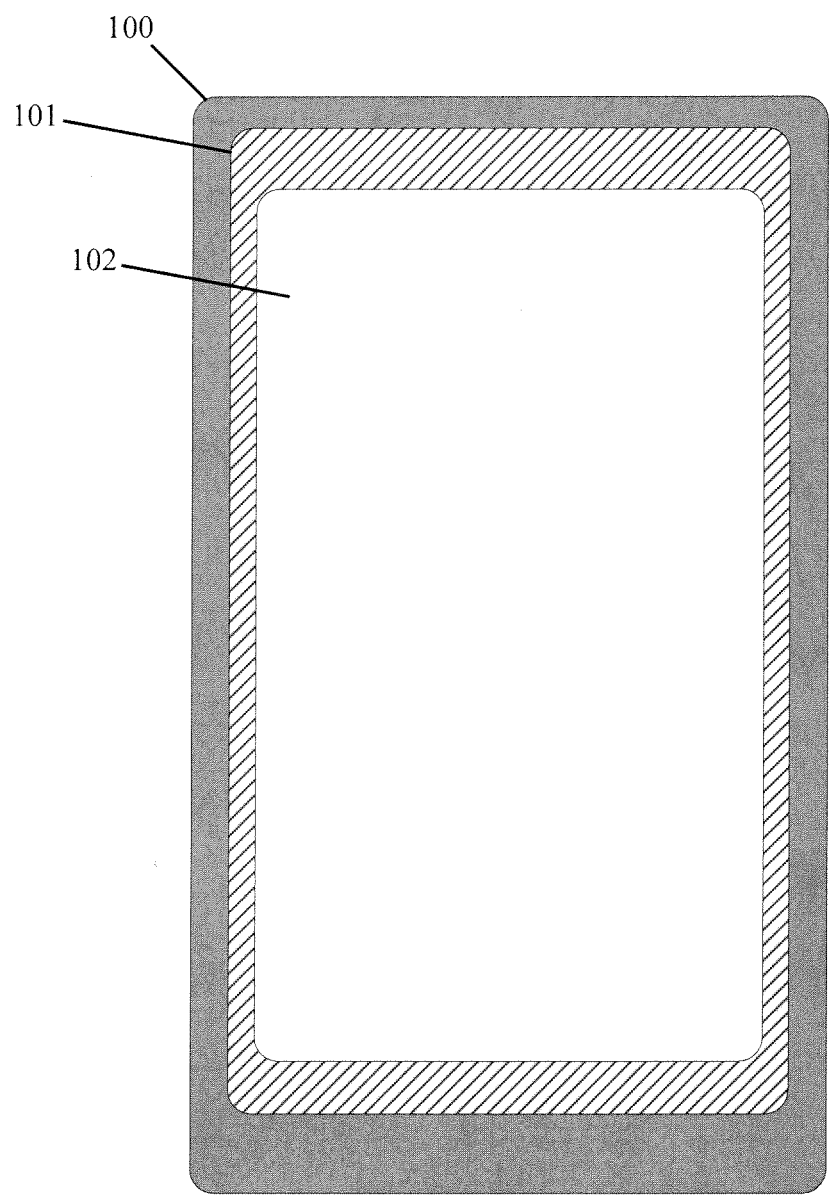
FIG. 1 illustrates an example of a client device for implementing various aspects of the subject disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present disclosure provides a method and system for providing visual feedback to a user in response to a user selection, regarding the scope and/or progress of response to the selection. In some aspects, a user gesture (e.g., a touch or pen long press) indicates a request by the user to select and perform one or more actions with respect to selected content. For example, the response may include providing a contextual menu including one or more related actions for display in response to the gesture. In some implementations, the response may include a specific action to be performed (e.g., when only a single action is possible, and/or a default action is associated with the specific gesture). The gesture may be a simple selection request such as a click. In one example, the gesture is defined by its duration and/or pattern.

In response to the gesture, feedback may be provided to the user regarding the progress of the request and/or the scope of the content affected by the response. The feedback may, for example, indicate the progress of generating a response to the user request indicated by the gesture. In one example, the feedback may define a scope or the range of content selected and/or acted upon (i.e., the range of content being selected in view of the gesture). In one example, the feedback may include a visual indication presented to the user that represents the scope of the content effected by or acted upon according to the gesture and/or the amount of time until the related actions will appear and/or trigger.

The visual representation may, in one implementation, be provided as a transparent circle drawn after the beginning of a selection or gesture beneath the point of selection (e.g., user's finger, pen, cursor, etc.). Other shapes may also be used in lieu of a circle. In one example, the visual representation may be a filling effect. In some implementation, the ratio of the content filled in comparison with the entire content being acted upon by the gesture may indicate the progress of the request, such as, the time until a response is provided to the user. In one example, the area filled once the one or more related actions are presented to the user and/or an action is completed may represent the scope of the content the related actions will act upon.

For example, upon receiving an indication of a user gesture (e.g., a selection that lasts longer than a threshold amount of time, for example longer than a click, or other gesture corresponding to a request to trigger related actions), a visual representation may be generated and provided for display. For example, a circle may appear and expand until it covers the full size of the content area (e.g., an image, a text field, a text box, a link, other field or box, a paragraph, a collection of text, a page, or other defined area containing content). In one example, the visual representation provides feedback regarding the content scope and/or progress of the request.

FIG. 1 illustrates an example of a client device for implementing various aspects of the subject disclosure. The device 100 is illustrated as a mobile device equipped with touchscreen 101. Display area 102 provides for display of content at the device 100. Device 100 may further include a selection mechanism (e.g., through touch, or pen) for selection of content items displayed within display area 102 of touch screen 101. In one example, device 100 may further be coupled to one or more input mechanisms (not shown) for receiving input regarding content items displayed within display area 102.

In some implementations, device 100 includes a processing device and a data store. The processing device executes computer instructions stored in data store, for example, to facilitate providing content selection feedback to a user at the device 100. Device 100 may further be in communication with one or more remote servers through a network or other communication means, for example, for receiving content for display at the device.

Although device 100 is illustrated as a smartphone, it is understood the subject technology is applicable to other devices that may implement text input and/or selection mechanism as described herein (e.g., devices having touch capability), such as personal computers, laptop computers, tablet computers (e.g., including e-book readers), video game devices, and the like. Although touchscreen 101 is described as including both input and display capability, in one example, the device 100 may include and/or be communicationally coupled to a separate display for displaying items. In one example, the touchscreen 101 may be implemented using any device providing an input mechanism providing for text input (e.g., through a virtual keyboard) and/or selection (e.g., through touch or pen).

A user may perform a gesture (e.g., a tap or a click) at the device 100 with regard to a content item being displayed within display area 102. The device 100 may receive the gesture and identify a response with respect to the gesture. The device 100 may further be configured to generate and provide the response to the user at device 100. The device 100 also determines a progress of the request from the time the request is received until the response is provided to the user. In one example, the device 100 generates a visual indication of the progress of the response and provides the indication for display within display area 102. The visual indication generated by device 100 may be updated as the response is being generated until the response is complete and provided to the user. In one example, the scope of the content that is the subject of the request is further determined. In one example, the visual indication further provides an indication of the scope of the content.

Figure 2:
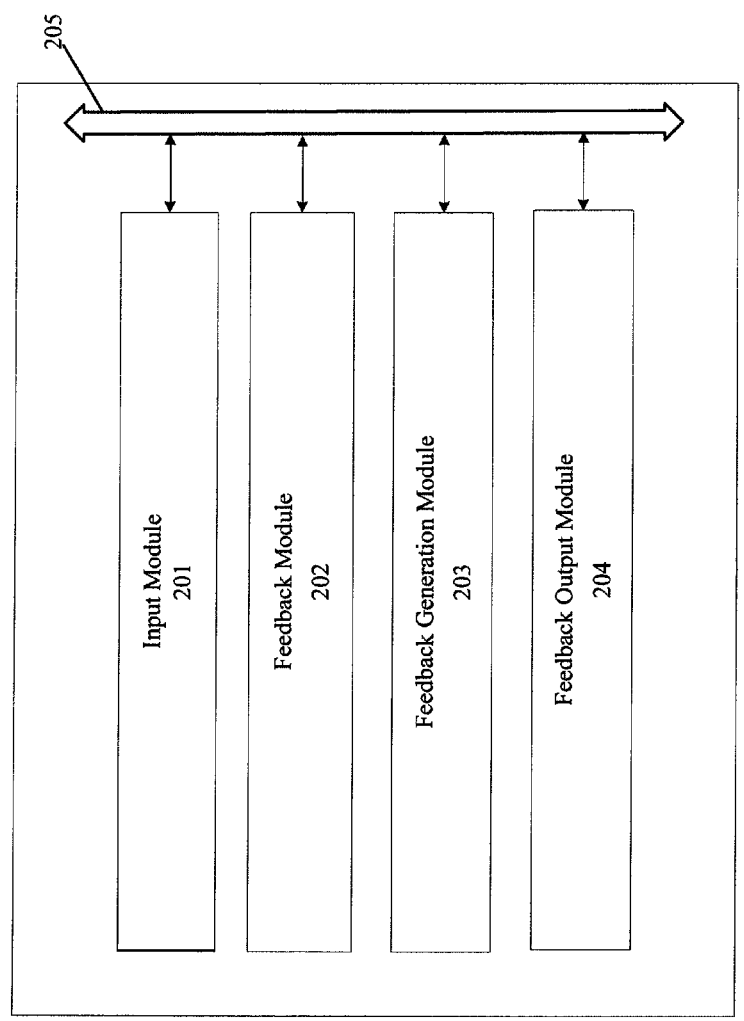
FIG. 2 illustrates an example of system for providing content selection feedback to a user indicating the progress and/or scope of user request.

FIG. 2 illustrates an example of system 200 for providing content selection feedback to a user indicating the progress and/or scope of user request. System 200, for example, may be part of device 100. System 200 comprises input module 201, feedback module 202, feedback generation module 203 and feedback output module 204. These modules may be in communication with one another. In one example, the modules 201, 202, 203 and 204 are coupled through a communication bus 205.

In one example, the input module 201 is configured to receive a user input (e.g., touch input using a pen or finger, mouse click, keyboard input, etc.) entered at the touch-sensitive screen. In one example, the input module 201 provides a user input (e.g., a gesture) to the feedback module 202. The feedback module 202 receives the input from the input module 201 and determines a scope of the content being acted upon according to the input. The feedback module 202 may further determine a progress of the response to the request. The feedback module 202 provides the determined scope and/or progress to the feedback generation module 203. The feedback generation module 204 generates a feedback (e.g., a visual indication) indicating the determined scope of the input and/or progress of the response, and provides the generated feedback to the feedback output module 204. The feedback output module 204 provides the feedback to the user at the device (e.g., device 100).

In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
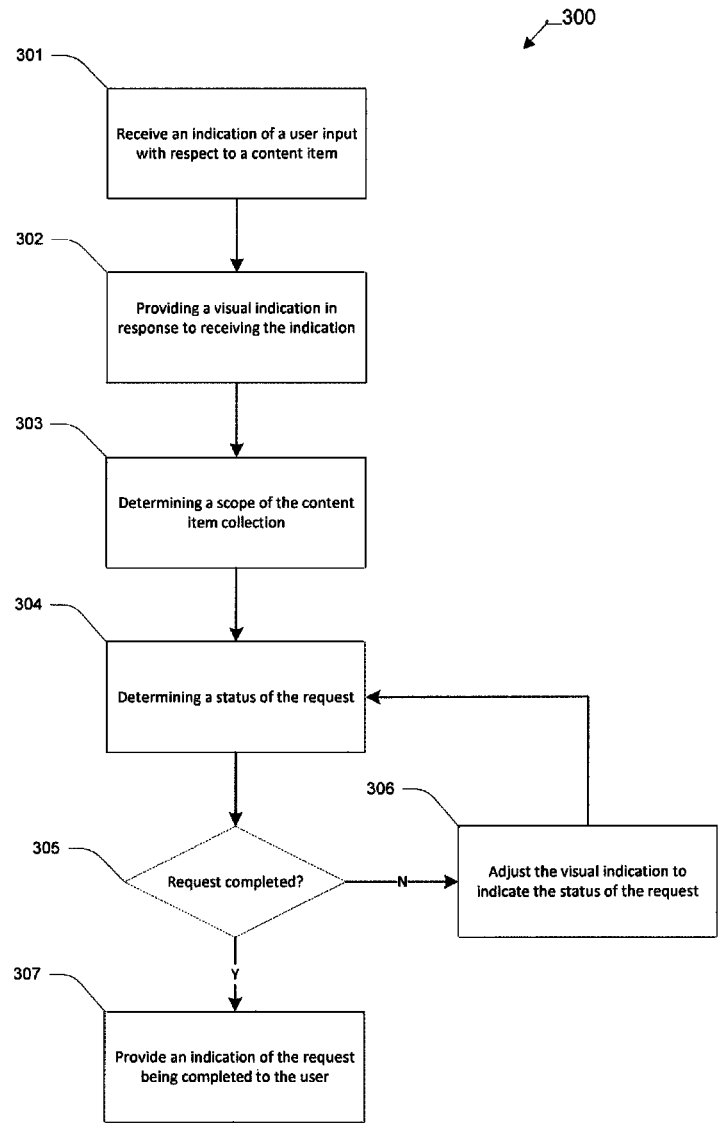
FIG. 3 illustrates a flow diagram of an example process for providing content selection feedback.

FIG. 3 illustrates a flow diagram of an example process 300 for providing content selection feedback. In step 301, an indication of a user input with respect to a content item is received. In one example, the content item may include a collection of content, including text, images, video, links, or other content being provided for display to a user. In some examples, the content includes a portion of content having defined boundaries (e.g., a paragraph, line or portion of text, content displayed within a box or bordered area, a page, an image, a video, a link, etc.). In some aspects, a user input (e.g., a gesture such as a long press) indicates a request by the user to select and perform one or more actions with respect to the content item. The input may be a simple selection request such as a click. In one example, the input is defined by its duration and/or pattern. In one example, the user input may be a selection that is longer than a threshold amount of time (e.g., longer than a click, such as a long press), and/or may have a predefined pattern that indicates a desire to trigger related actions as a response. In one example, a defined response may be mapped to each one of one or more possible inputs at the device.

For example, the response may include providing a contextual menu including one or more related actions for display in response to the gesture. In some implementations, the response may include a specific action to be performed (e.g., when only a single action is possible, and/or a default action is associated with the specific gesture).

In step 302, a visual indication is provided for display to the user, to indicate that the input was received at the device. In one example, in response to the user selection, feedback may be generated when the indication is detect and may be provided to the user. The feedback may for example indicate that the input has been received and a response is in progress. The visual representation may, in one implementation, be provided as a transparent circle drawn after the beginning of a selection or gesture beneath the point of selection (e.g., user's finger, pen, cursor, etc.). Other shapes may also be used in lieu of a circle.

In step 303, a scope of the content item is determined. In one example, the scope refers to the boundaries of the content item which will be acted upon in response to the input. In one example, the visual indication of step 302 may provide an indication of the scope of the content effected by or acted upon according to the input. In one example, the scope may for example be visually indicated by generating a border around the content item. In another example, a first fill color may be applied to the entire area covering the content item.

In step 304, a status of the response is determined. For example, the status is defined as whether the response has been completed. In one example, the status further includes information regarding a total estimated time for performing a response and/or the time until the request corresponding to the input is completed and a response is provided to the user. In one example, the status of the response is determined in part based on the scope of the content as determined in step 303.

In step 305, it is determined if the determined status indicates that the request is completed and a response is ready to be provided to the user. If, in step 305, it is determined that the request is not yet completed, in step 306, the visual indication of step 302 is updated to indicate the status of the request. In some examples, the visual representation comprises a filling effect. In some implementation, the ratio of the content area filled in comparison with the entire content area covering the content being acted upon by the gesture may indicate the time until a response is provided to the user (e.g., providing related actions for display, for example, in the form of a context menu of related actions, and/or performing a specific action). The feedback may, for example, indicate the progress of generating a response to the user request indicated by the gesture. In one example, the progress may be defined according to the amount of time until the related actions will appear and/or trigger.

Otherwise, if the request is completed, in step 307, an indication of the request being completed is provided to the user. In one example, in step 307, the indication of step 302, updated in step 306, is updated to indicate that the request is completed. As described above, the feedback of step 302, updated in step 306, may be a filling effect, and the feedback of step 307 may include the entire content item area being filled in. In one example, the area filled once the one or more related actions are presented to the user and/or an action is completed may represent the scope of the content. In one example, the completed indication may provide an indication of the scope of the content item as determined in step 303. In one example, the feedback of step 307 may include a notification or other indication that the request is completed (e.g., a message, the entire area being filled, etc.).

According a selection feedback is provided to the user regarding the content scope and/or progress of a user request. It should be noted that the selection feedback being provided to a user according to processes described herein is described as being a visual indication for exemplary purposes. Any other type of indication (e.g., audio) may also be provided in addition to or in lieu of a visual indication to provide the user with information regarding the progress and/or scope a user input.

Figure 4:
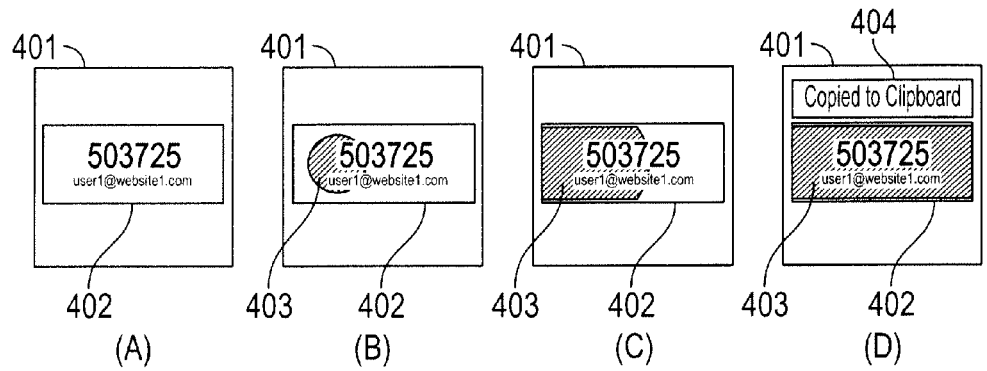
FIGS. 4, 5 and 6 illustrate examples of visual feedback being presented to the user.
Figure 5:
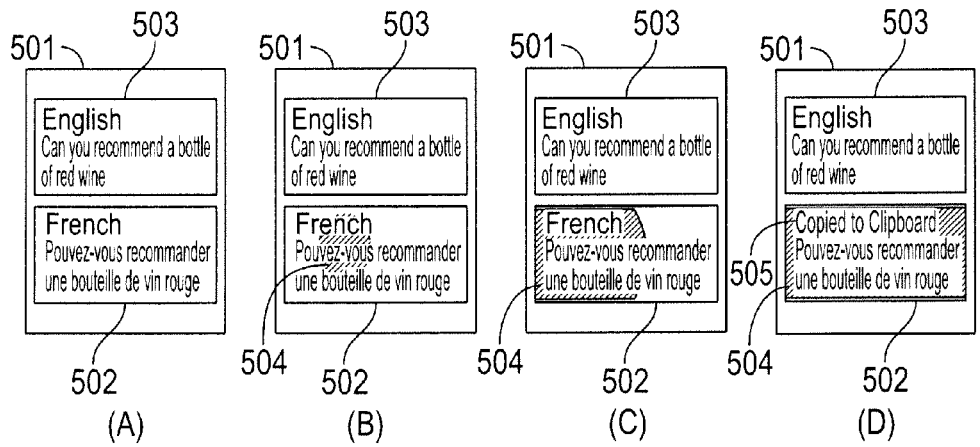
Figure 6:
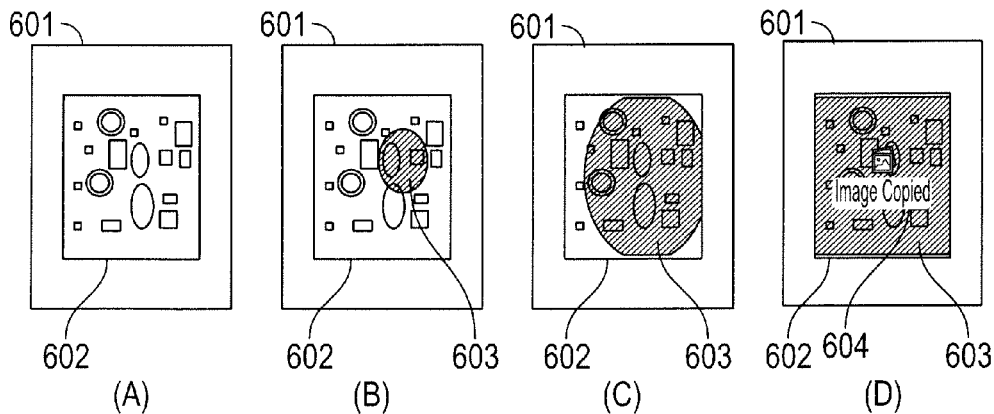

FIGS. 4, 5 and 6 illustrate examples of visual feedback being presented to the user. For example, as shown in these figures, upon receiving an indication of a user selection (e.g., an input that lasts longer than a threshold amount of time), a circle may appear and expand until it covers the full size of the content area. For example, FIG. 4 illustrates a selection of text 402 being displayed to a user on screen 401. As shown, the process begins in stage A, when the text is provided for display to the user. At some point during stage A, a selection input is received with regards to the text 402. The process then progresses to stage B, and provides a visual indication 403, in the shape of a circle, indicating that the input was received. The visual indication 403 is updated, as shown from stage B to C to D to indicate a progress of the request. Once the request is completed and an action is performed, the visual indication 403 provides an indication of the request being completed. In stage D, the visual indication further represents the scope of the content acted upon (e.g., texted 402). In this example, the request includes copying text 402 to a clipboard. As shown in this example, the visual indication of the request being completed includes the entire area displaying text 402 being filled in. A notification 404 stating that the text 402 has been "copied to clipboard" is further provided.

FIG. 5 illustrates a selection of text 502 being displayed within a screen 501. As shown, the process begins in stage A, when the text 502 and 503 are provided for display to the user within screen 501. At some point during stage A, a selection input is received with regards to the text 502. The process then progresses to stage B, and provides a visual indication 504, in the shape of a circle, indicating that the input was received. The visual indication 504 is updated, as shown from stage B to C to D to indicate a progress of the request. Once the request is completed and an action is performed, the visual indication 504 is updated to indicate the request being completed. In stage D, the visual indication 504 further represents the scope of the content acted upon (e.g., text 502). In this example, the request includes copying text 502 to a clipboard. As shown in this example, the visual indication of the request being completed includes the entire area displaying text 502 being filled in. In addition, a notification 505 stating that the text 502 has been "copied to clipboard" is further provided.

FIG. 6 illustrates an image 602 being displayed within a screen 601. As shown, the process begins in stage A, when the image 602 is provided for display to the user within screen. At some point during stage A, a selection input is received with regards to the image 602. The process then progresses to stage B, and provides a visual indication 603, in the shape of a circle, indicating that the input was received. The visual indication 603 is updated, as shown from stage B to C to D to indicate a progress of the request. Once the request is completed and an action is performed, the visual indication 603 indicates the request being completed. In stage D, the visual indication further represents the scope of the content acted upon (e.g., image 602). In this example, the request includes copying image 602. As shown in this example, the visual indication of the request being completed includes the entire image 602 being filled in. In addition, a notification 604 stating that the image 602 has been copied is further provided.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 7:
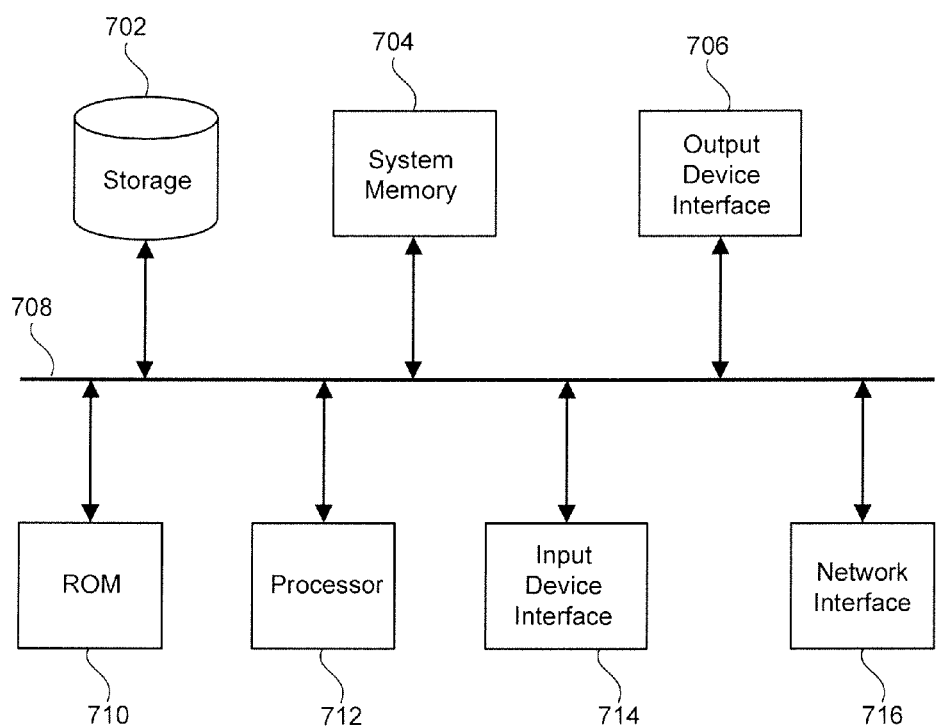
FIG. 7 conceptually illustrates an electronic system with which some implementations of the subject technology are implemented.

FIG. 7 conceptually illustrates an electronic system with which some implementations of the subject technology are implemented. Electronic system 700 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such a random access memory. System memory 704 stores some of the instructions and data that the processor needs at runtime. In some implementations, the processes of the subject disclosure are stored in system memory 704, permanent storage device 702, and/or ROM 710. For example, the various memory units include instructions for providing selection feedback to a user according to various embodiments. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

Finally, as shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for visually providing feedback regarding a user selection, the method comprising:
   receiving an indication of an input associated with a user with respect to a content item, wherein the input corresponds to a request to trigger one or more related actions for the content item;
   providing a visual indication in response to the request for display to the user, wherein the visual indication is provided in a first state showing that the request has been received;
   determining a status of the request;
   determining if the request is completed based on the status;
   updating the visual indication to a second state indicating a progress of the request based on the status if the request is not completed; and
   providing the updated visual indication for display to the user, wherein the visual indication and updated visual indication comprise a filling effect applied to an area comprising the content item.

2. The method of claim 1, further comprising:
   determining a scope of the content item, the scope of the content item being defined as all of the content item being acted upon by the one or more related actions.

3. The method of claim 2, wherein one or more of the visual indication or updated visual indication further provides an indication of the scope of the content item.

4. The method of claim 1, updating the visual indication to a third state when the request is completed.

5. The method of claim 4, wherein the updated visual indication at the third state provides an indication of a scope of the content item.

6. The method of claim 1, wherein determining the status of the request and updating the visual indication to the second state indicating the progress of the request based on the status are repeated until the request is completed.

7. The method of claim 1, wherein the updated visual indication provides an indication of a portion of the request that is completed.

8. The method of claim 1, wherein updating the visual indication comprises filling a larger portion of the area comprising the content item.

9. The method of claim 1, wherein an amount of the area filled in comparison to the area comprising the content item indicates the progress of the request according to the status.

10. The method of claim 1, wherein the area indicates a scope of the content item.

11. The method of claim 1, further comprising:
    providing a response to the input when the request is completed.

12. The method of claim 11, wherein the response comprises providing a context menu with the one or more related actions for display to the user.

13. The method of claim 12, wherein the response comprises performing a related action of the one or more related actions.

14. The method of claim 13, further comprising:
    providing a notification for display indicating that the related action was performed.

15. The method of claim 13, wherein the related action comprises a default related action assigned to the content item.

16. The method of claim 13, wherein the related action is an only related action associated with the content item.

17. A system for visually providing feedback regarding a user selection, the system comprising:
    one or more processors; and
    a machine-readable medium comprising instructions stored therein, which when executed by the processors, cause the processors to perform operations comprising:
       receiving an indication of an input associated with a user with respect to content, wherein the input corresponds to a request to trigger one or more related actions for the content;
       providing a visual indication in response to the request for display to the user in a first state showing that the request has been received, wherein the visual indication is applied to an area encompassing the content;
       determining a status of the request;
       determining if the request is completed based on the status;
       updating the visual indication to a second state indicating a progress of the request based on the status if the request is not completed;
       updating the visual indication to a third state indicating that the request is completed when the request is completed; and
       providing the updated visual indication for display to the user.

18. The system of claim 17, the operations further comprising:
    determining a scope of the request, wherein the updated visual indication in the third state provides an indication of the scope of the request.

19. The system of claim 17, wherein the visual indication comprises a filling effect applied to the area comprising the content.

20. A machine-readable medium comprising instructions stored therein, which when executed by a machine, cause the machine to perform operations comprising:
    receiving an indication of an input associated with a user with respect to a content item, wherein the input corresponds to a request to trigger one or more related actions for the content item;
    providing a visual indication provided in a first state showing that the request has been received for display to the user in response to the request, wherein the visual indication is applied to an area encompassing the content item;
    determining a status of the request;
    determining a scope of the request;
    determining if the request is completed based on the status;
    updating the visual indication to a second state indicating a progress of the request based on the status if the request is not completed;
    updating the visual indication to a third state indicating that the request is completed when the request is completed, wherein the updated visual indication in the third state provides an indication of the scope of the request; and
    providing the updated visual indication for display to the user.

21. The machine-readable medium of claim 20, wherein the visual indication comprises a filling effect applied to the area comprising the content item.

\* \* \* \* \*